United States Patent
Ruby

(10) Patent No.: US 9,069,005 B2
(45) Date of Patent: Jun. 30, 2015

(54) CAPACITANCE DETECTOR FOR ACCELEROMETER AND GYROSCOPE AND ACCELEROMETER AND GYROSCOPE WITH CAPACITANCE DETECTOR

(75) Inventor: Richard C. Ruby, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 993 days.

(21) Appl. No.: 13/162,883

(22) Filed: Jun. 17, 2011

(65) Prior Publication Data

US 2012/0318060 A1 Dec. 20, 2012

(51) Int. Cl.
G01P 15/125 (2006.01)
G01P 15/08 (2006.01)
G01C 19/5776 (2012.01)

(52) U.S. Cl.
CPC .......... *G01P 15/125* (2013.01); *G01P 15/0802* (2013.01); *G01P 2015/0831* (2013.01); *G01C 19/5776* (2013.01)

(58) Field of Classification Search
CPC .................. G01C 19/5776; G01P 2015/0831
USPC .......... 73/493, 504.02, 514.32, 649; 257/416; 331/68
See application file for complete search history.

(56) References Cited

U.S. PATENT DOCUMENTS

| | | | |
|---|---|---|---|
| 5,668,057 A | 9/1997 | Eda et al. | |
| 5,885,468 A * | 3/1999 | Kozlowski | 216/2 |
| 6,228,675 B1 | 5/2001 | Ruby et al. | |
| 6,265,246 B1 | 7/2001 | Ruby et al. | |
| 6,376,280 B1 * | 4/2002 | Ruby et al. | 438/118 |
| 6,429,511 B2 * | 8/2002 | Ruby et al. | 257/704 |
| 6,946,928 B2 | 9/2005 | Larson, III et al. | |
| 6,991,957 B2 * | 1/2006 | Eskridge | 438/50 |
| 7,098,758 B2 * | 8/2006 | Wang et al. | 333/189 |
| 7,190,238 B2 * | 3/2007 | Hosokawa et al. | 331/158 |
| 7,358,651 B2 * | 4/2008 | Ruby et al. | 310/334 |
| 7,385,467 B2 * | 6/2008 | Stoemmer et al. | 333/189 |

(Continued)

FOREIGN PATENT DOCUMENTS

WO  2009111874 A1  9/2009

OTHER PUBLICATIONS

"One-Axis Accelerometer with sigma-delta modulator", 3D MEMS Software, http://www.coventor.com/mems/applications/One_Axis_Accelerometer, pp. 1-4.

(Continued)

*Primary Examiner* — Laura Martin
*Assistant Examiner* — Samir M Shah

(57) ABSTRACT

A capacitance-to-frequency converter is configured to convert a difference between first and second capacitances produced of a teeter-totter capacitive transducer as a result of a rotational force being applied to the teeter-totter capacitive transducer to a first signal having a first frequency that is a function of the rotational force, and to convert a sum of the first and second capacitances produced as a result of an acceleration force to a second signal having a second frequency that is a function of the acceleration force. The capacitance-to-frequency converter includes a first oscillator having a first oscillator frequency that changes in response to a change in the first capacitance; a second oscillator having a second oscillator frequency that changes in response to a change in the second capacitance; and a mixer having first and second mixer inputs connected outputs of the first and second oscillators.

18 Claims, 8 Drawing Sheets

(56) References Cited

U.S. PATENT DOCUMENTS

| | | | |
|---|---|---|---|
| 7,427,819 B2* | 9/2008 | Hoen et al. | 310/320 |
| 7,578,190 B2* | 8/2009 | Lin et al. | 73/514.29 |
| 7,610,809 B2* | 11/2009 | McNeil et al. | 73/514.32 |
| 7,615,833 B2* | 11/2009 | Larson et al. | 257/416 |
| 7,629,865 B2 | 12/2009 | Ruby | |
| 7,696,004 B2* | 4/2010 | Yuan et al. | 438/106 |
| 7,721,604 B2* | 5/2010 | Pruetz | 73/514.32 |
| 8,096,182 B2* | 1/2012 | Lin et al. | 73/514.32 |
| 8,186,221 B2* | 5/2012 | Lin et al. | 73/514.32 |
| 8,220,330 B2* | 7/2012 | Miller et al. | 73/514.32 |
| 8,232,845 B2* | 7/2012 | Ruby et al. | 331/68 |
| 8,407,905 B1* | 4/2013 | Hsu et al. | 33/355 R |
| 8,429,971 B2* | 4/2013 | Classen et al. | 73/514.32 |
| 8,459,114 B2* | 6/2013 | Hsu et al. | 73/514.32 |
| 8,525,600 B1* | 9/2013 | Vendryes et al. | 331/68 |
| 8,528,404 B2* | 9/2013 | Ayazi | 73/514.29 |
| 8,627,719 B2* | 1/2014 | Offenberg et al. | 73/514.32 |
| 8,823,247 B2* | 9/2014 | Ichikawa et al. | 310/344 |
| 2003/0106372 A1* | 6/2003 | Adams et al. | 73/514.32 |
| 2005/0145030 A1* | 7/2005 | Elliott et al. | 73/514.18 |
| 2006/0001123 A1* | 1/2006 | Heck et al. | 257/528 |
| 2007/0181963 A1* | 8/2007 | Berkcan et al. | 257/415 |
| 2008/0202239 A1 | 8/2008 | Fazzio et al. | |
| 2009/0031809 A1* | 2/2009 | Lin et al. | 73/514.32 |
| 2009/0146746 A1 | 6/2009 | Unkrich et al. | |
| 2009/0241662 A1* | 10/2009 | Supino et al. | 73/504.12 |
| 2009/0293616 A1* | 12/2009 | Lin et al. | 73/514.32 |
| 2009/0308159 A1* | 12/2009 | Frey et al. | 73/514.32 |
| 2010/0112743 A1 | 5/2010 | Kawauchi | |
| 2010/0122578 A1* | 5/2010 | Classen | 73/514.32 |
| 2011/0023604 A1* | 2/2011 | Cazzaniga et al. | 73/514.32 |
| 2011/0296917 A1* | 12/2011 | Reinmuth et al. | 73/514.32 |
| 2012/0075026 A1* | 3/2012 | Ruby et al. | 331/70 |
| 2012/0204642 A1* | 8/2012 | McNeil et al. | 73/514.32 |
| 2013/0194057 A1* | 8/2013 | Ruby | 333/188 |

OTHER PUBLICATIONS

RF MEMS: Reference, http://www.thefullwiki.org/RF_MEMS, pp. 1-3.

Aigner, R., "High Performance RF-Filters Suitable for Above IC Integration: Film Bulk-Acoustic-Resonators (FBAR) on Silicon", *Proceedings of the IEEE of Custom Integrated Circuits Conference*, 2003, 141-146.

Aissi, M. et al., "A 5 GHz Above-IC FBAR Low Phase Noise Balanced Oscillator", *Radio Frequency Integrated Circuits (RFIC) Symposium* 2006, 4 pages.

Dubois, M. A. et al., "Monolithic above-IC Resonator Technology for Integrated Architectures in Mobile and Wireless Communication", *IEEE Journal of Solid-State Circuites*, vol. 41, Issue: 1, 7-16.

Elbrecht, L. et al., "Integration of Bulk Acoustic Wave Filters: Concepts and Trends", *IEEE-MTT-S International Microwave Symposium Digest*, vol. 1 2004, 395-398.

* cited by examiner

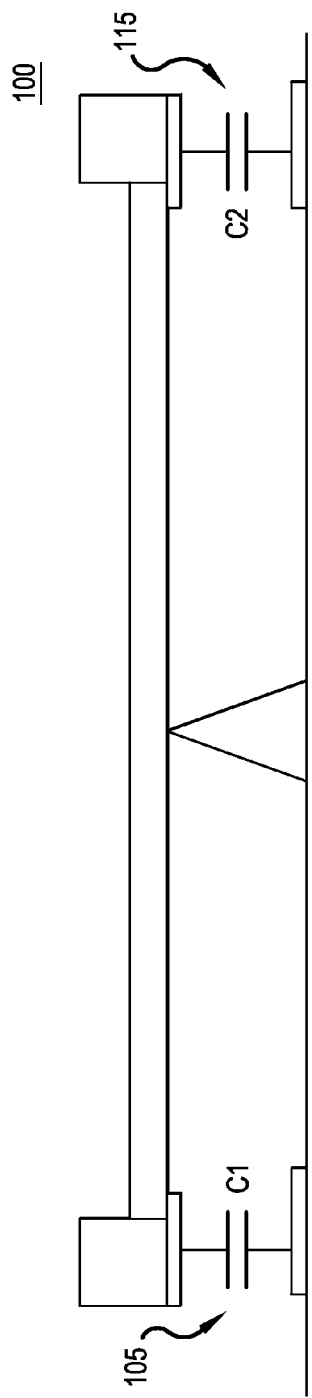
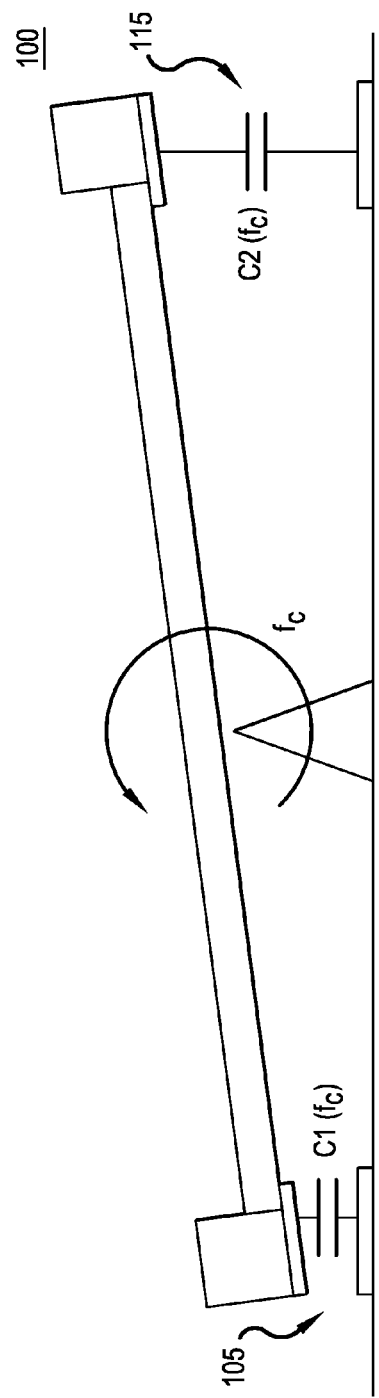

CAPACITANCE DETECTOR FOR ACCELEROMETER AND GYROSCOPE AND ACCELEROMETER AND GYROSCOPE WITH CAPACITANCE DETECTOR

BACKGROUND

There are an increasing number of devices where it is desired or needed to be able to detect and quantify an acceleration (i.e., a linear acceleration) force and/or a rotational force that is applied to the device. In particular, many game-playing devices and portable electronic devices need to be able to detect rotation and movement of the device. For example, a number of devices use accelerometers to orient the display of an image on a display screen to match the orientation in which the device is held, i.e., switching between portrait and landscape modes depending upon how the device is held. Such devices include some tablet personal computers (PCs), smart phones, and digital cameras Currently, microelectromechanical system (MEMS) accelerometers and gyroscopes are generally used in these devices for detecting and quantifying acceleration (linear motion) and rotational motion. For example, the current version of the SONY WII MOTIONPLUS® expansion device for the WII® Remote video game controller for the WII® home video game system uses a dual-axis tuning fork gyroscope and a single-axis gyroscope which can determine rotational motion.

Gyroscopes are also useful for "dead reckoning" of a device. That is, a gyroscope can be used to track a device's movements and turns, for example to show the device's location on a map—which may be particularly useful when the device is inside a building or underground or otherwise isolated from Global Positioning System (GPS) signals.

It would be desirable, therefore, to provide a device that can measure both acceleration and rotation. It would also be desirable to provide a method of detecting both acceleration and rotation.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions shown in the drawings may be arbitrarily increased or decreased for clarity of discussion. Wherever applicable and practical, like reference numerals refer to like elements.

FIGS. 1A-B illustrate principles of operation of a microelectromechanical system (MEMS) teeter-totter capacitive transducer for detecting rotation (from the Coriolis Force, fc).

DETAILED DESCRIPTION

Figure 1C:
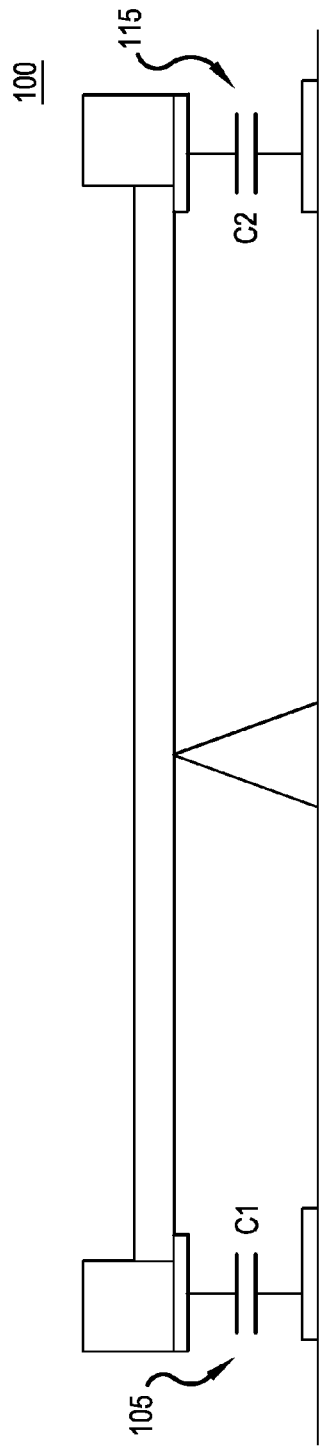
FIGS. 1C-D illustrate principles of operation of a MEMS teeter-totter capacitive transducer for detecting acceleration (fa).

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices. As used herein, "approximately" means within 10% and "substantially" means within 5%. As used herein, when a first structure, material, or layer is the to cover a second structure, material, or layer, this includes cases where the first structure, material, or layer substantially or completely encases or surrounds the second structure, material or layer.

FIGS. 1A-B illustrate principles of operation of a microelectromechanical system (MEMS) teeter-totter capacitive transducer 100 for detecting rotation which can be employed in a rotation detector or gyroscope. First and second capacitors 105 and 115 are provided at opposite ends of MEMS teeter-totter capacitive transducer 100.

FIG. 1A illustrates the MEMS proof mass at rest, in the absence of a rotational force being applied to MEMS teeter-totter capacitive transducer 100. In a typical arrangement, when the MEMS proof mass is at rest as shown in FIG. 1A, and no rotational or acceleration force is applied to it, the capacitance C1 of capacitor 105 is substantially the same as the capacitance C2 of capacitor 115:

$$C1 = C2 + \sigma, \quad (1)$$

where $C1 \approx C2 \gg \sigma$, and $\sigma$ may reflect the effect of manufacturing tolerances for MEMS teeter-totter capacitive transducer 100. In some embodiments, a may be less than 5 percent of C1 or C2. In some embodiments, $\sigma$ may be less than 2 percent of C1 or C2.

FIG. 1B illustrates the MEMS proof mass when a Coriolis (rotational) force, fc, is applied to MEMS teeter-totter capacitive transducer 100. As shown in FIG. 1B, when the rotational force is applied to the MEMS proof mass, the capacitances of first and second capacitors 105 and 115 change as a result of the rotational force. Indeed, the changes in the capacitances, $\Delta C1$ and $\Delta C2$, are functions of the rotational force, $f_C$: $\Delta C1 (f_C)$ and $\Delta C2(f_C)$, where:

$$\Delta C1(f_C) \approx -\Delta C2(f_C) = \Delta C_{1,2}(f_C) \quad (2)$$

In the example shown in FIG. 1B, when a counterclockwise rotational force is applied to MEMS teeter-totter capacitive transducer 100, the capacitance of capacitor 105 increases, and the capacitance of capacitor 115 decreases. The opposite happens in response to a clockwise rotational force.

To detect a change in capacitance, an AC signal may be applied to one or both capacitors such that a change in the capacitance produces a change in the impedance the capacitor presents to the AC signal. A low noise amplifier may convert the change in impedance presented by the capacitor to the AC signal to a voltage that is a function of the rotational force.

Figure 1D:
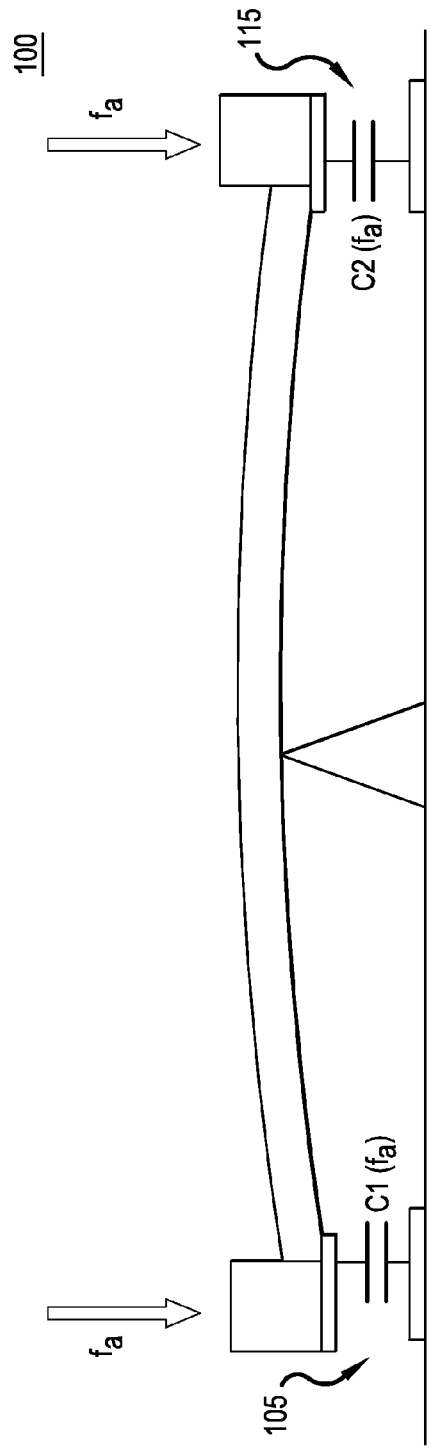

FIGS. 1C-D illustrate principles of operation of a MEMS teeter-totter capacitive transducer 100 for detecting acceleration.

FIG. 1C like FIG. 1A illustrates the proof mass at rest when no acceleration force is applied to it, and again the capacitance C1 of capacitor 105 is substantially the same as the capacitance C2 of capacitor 115.

FIG. 1D illustrates the MEMS proof mass when an acceleration (i.e., a linear acceleration) force is applied to MEMS teeter-totter capacitive transducer 100. As shown in FIG. 1D, when the acceleration force is applied, the capacitances of first and second capacitors 105 and 115 change as a result of the acceleration force. Indeed, the change in the capacitances, $\Delta C1$ and $\Delta C2$, are functions of the acceleration force, $f_A$: $\Delta C1(f_A)$ and $\Delta C2(f_A)$, where:

$$\Delta C1(f_A) \approx \Delta C2(f_A) \equiv \Delta C_{1,2}(f_A) \qquad (3)$$

In the example shown in FIG. 1D, when a downward acceleration force is applied to MEMS teeter-totter capacitive transducer 100, the capacitances of both capacitors 105 and 115 increase from their nominal values C1 and C2. The opposite happens in response to an upward acceleration force.

Accordingly, net positive (or negative) changes in charges on first and second capacitors 105 and 115 can be linked to an acceleration force being applied to MEMS teeter-totter capacitive transducer 100.

Figure 2:
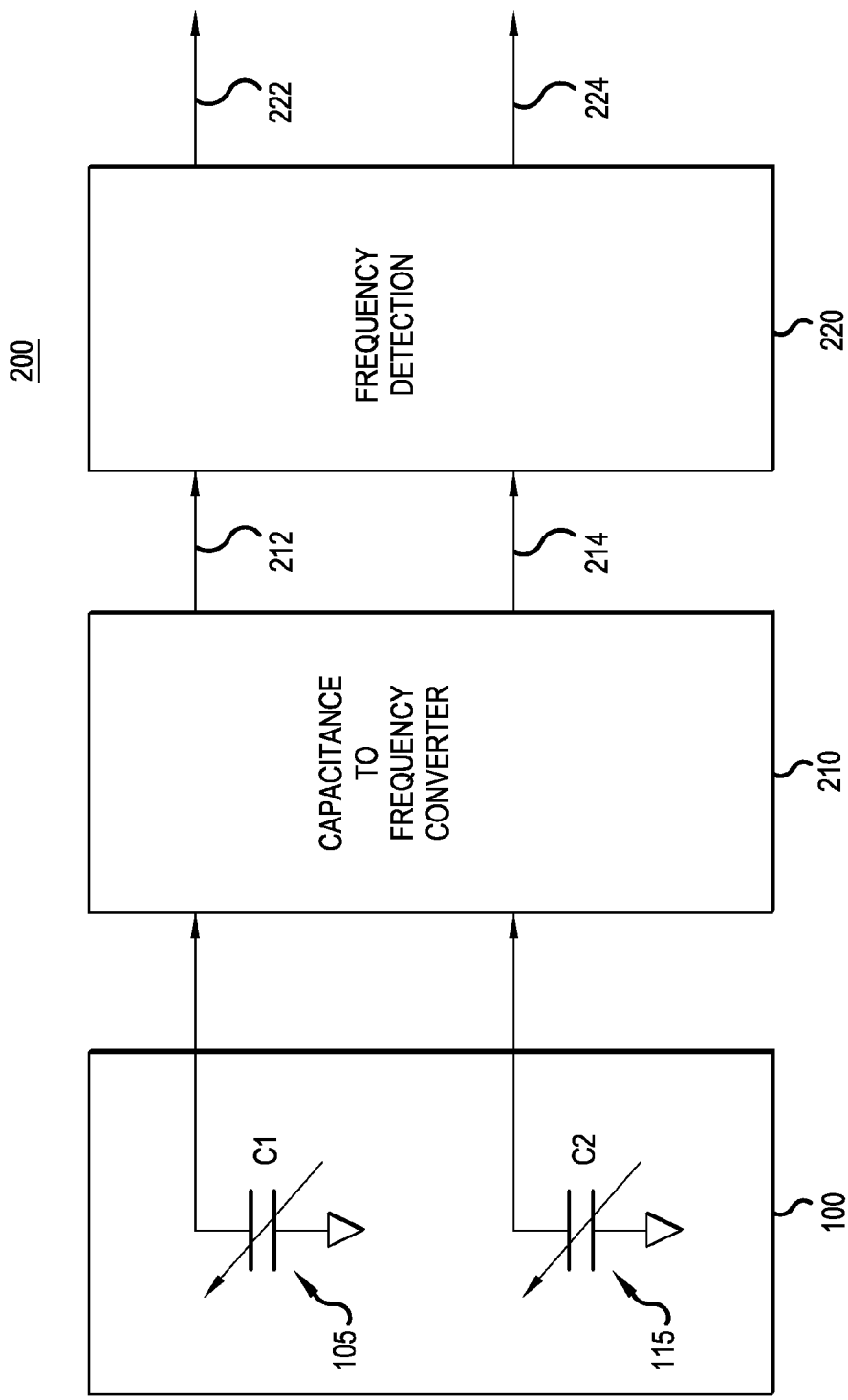
FIG. 2 is a high level functional block diagram of one example embodiment of a device that may function as a combined accelerometer and rotation detector.

FIG. 2 is a high level functional block diagram of one example embodiment of a device 200 that may function as a combined accelerometer and rotation detector.

Device 200 includes MEMS teeter-totter capacitive transducer 100, a capacitance-to-frequency converter 210, and frequency detection block 220.

Capacitance-to-frequency converter 210 is configured to convert a change in the first and second capacitances of first and second capacitors 105 and 115 produced as a result of a rotational force being applied to teeter-totter capacitive transducer 100 to a change in the first frequency of a first signal 212. Capacitance-to-frequency converter 210 is also configured to convert a change in the first and second capacitances of first and second capacitors 105 and 115 produced as a result of an acceleration force (i.e., a linear acceleration force) being applied to teeter-totter capacitive transducer 100 to a change in a second frequency of a second signal 214.

Frequency detection block 220 detects the first and second frequencies of first and second signals 212 and 214 and outputs: a rotational force detection signal 222 that indicates the rotational force that is applied to MEMS teeter-totter capacitive transducer 100; and an acceleration force detection signal 224 that indicates the acceleration force that is applied to MEMS teeter-totter capacitive transducer 100. In some embodiments, frequency detection block 220 may include frequency counters for each of the first and second signals 212 and 214, or may include some other type of frequency detector, such as a discriminator, a phase-lock loop (PLL) frequency detector, etc.

Device 200 can detect both acceleration (i.e., linear acceleration), and rotation in one plane. For a three dimensional gyroscope, three devices 200 can be employed for detecting first, second, and third rotational forces in three different corresponding planes (e.g., orthogonal planes) that span three dimensional space.

Figure 3:
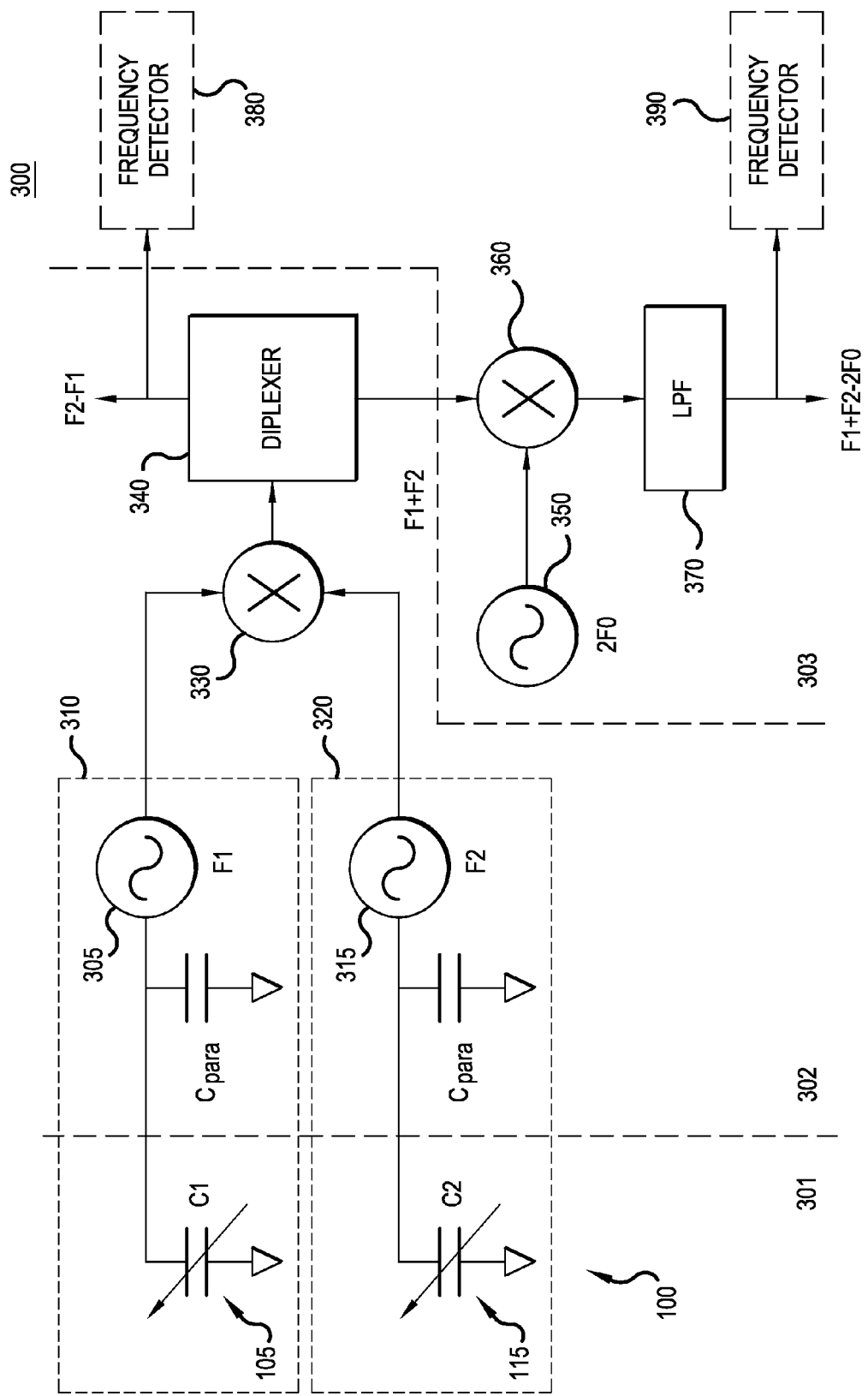
FIG. 3 is a more detailed functional block diagram of one example embodiment of a device that may function as a combined accelerometer and rotation detector.

FIG. 3 is a more detailed functional block diagram of one embodiment of a device 300 that may function as a combined accelerometer and rotation detector. In particular, device 300 may be one embodiment of the device 200 shown in FIG. 2.

Device 300 comprises: first and second oscillators 310 and 320; a first mixer 330: a diplexer 340, a third oscillator 350; a second mixer 360; a filter (e.g., a low pass filter (LPF)) 370; and optionally first and second frequency detectors 380 and 390 (in some embodiments, frequency detection may be performed externally to device 300).

First oscillator 310 operates at a first oscillator frequency, and second oscillator 320 operates at a second oscillator frequency. First and second oscillators 310 and 320 include first and second oscillator circuits 305 and 315, respectively, and further include first and second capacitors 105 and 115, respectively, of MEMS teeter-totter capacitive transducer 100. More specifically, first and second capacitors 105 and 115 form part of the resonant circuits of the first and second oscillators 310 and 320, respectively. Therefore, the first and second frequencies of first and second oscillators 310 and 320 change in response to changes in the capacitance of capacitor 105 and the capacitance of capacitor 115, respectively, for example in response to a rotational force and/or an acceleration force applied to MEMS teeter-totter capacitive transducer 100. Accordingly, the first and second oscillator frequencies may be expressed as a function of the acceleration force and the rotational force: $F1(f_A, f_C)$ and $F2(f_A, f_C)$, respectively.

In the absence of any rotational force ($f_C$) or acceleration force ($f_A$) being applied to MEMS teeter-totter capacitive transducer 100, first oscillator 310 operates at a nominal first oscillator frequency $F1_{NOM}$, and second oscillator 320 operates at a nominal second oscillator frequency $F2_{NOM}$. In a beneficial embodiment:

$$F2_{NOM} - F1_{NOM} = \delta, \qquad (4)$$

where $F1_{NOM} \approx F2_{NOM} \equiv F0 \gg \delta$.

Furthermore:

$$F1_{NOM} = \frac{1}{2\pi\sqrt{L1(C1 + C_{PARA} + C_P)}} \text{ and} \qquad (5)$$

$$F2_{NOM} = \frac{1}{2\pi\sqrt{L2(C2 + C_{PARA} + C_P)}}$$

where $C_P$ is the capacitance of the resonator, and $C_{PARA}$ is a parasitic capacitance If we assume that $C1 \approx C2 \equiv C_{1,2}$, and define:

$$CT = C_{1,2} + C_P + C_{PARA} \qquad (6)$$

then, by expanding the square root function, we get:

$$F1(f_A,f_C) \approx F1_{NOM}(1-0.5*(\Delta C_{1,2}(f_C)/C_T)+0.5*(\Delta C_{1,2}(f_A)/C_T)) \qquad (7)$$

$$F2(f_A,f_C) \approx F2_{NOM}(1+0.5*(\Delta C_{1,2}(f_C)/C_T)+0.5*(\Delta C_{1,2}(f_A)/C_T)) \qquad (8)$$

In an example embodiment, $C_P$ may be about 0.6 pF, $C_{PARA}$ may be about 0.3 pF, $C_{1,2}$ may be about 0.1 pF, and $\Delta C_{1,2}(f_A)$ and $\Delta C_{1,2}(f_C)$ may each have a maximum range of $\pm 10$ aF (i.e., $\pm 10^{-18}$ F).

In some embodiments, first and second oscillators 310 and 320 may be temperature stabilized and/or may include a varactor for frequency tuning and/or include a buffer amplifier.

In some embodiments, first and second oscillators 310 and 320 may each include an acoustic resonator, which may be a film bulk acoustic resonator (FBAR), a solidly mounted resonator (SMR, a zero drift resonator (ZDR), or a similar device.

First mixer 330 has first and second mixer inputs connected respectively to outputs of first and second oscillators 310 and 320, and also has a mixer output that is connected to the input of diplexer 340.

Diplexer 340 has first and second diplexer outputs which output first and second signals.

The first diplexer output of diplexer 340 provides a first signal that has a first frequency $F_X$ that is the difference between the second oscillator frequency of second oscillator 320, $F_2(f_A, f_C)$ and the first oscillator frequency of first oscillator 310, $F_1(f_A, f_C)$. From equations (4), (7) and (8) above we get:

$$F_X \approx \delta - 0.5*((F2(\Delta C_{1,2}(f_C)/C_Y) + (F1(\Delta C_{1,2}(f_C)/C_Y)) \approx \delta - F0*\Delta C_{1,2}(f_C)/C_Y \quad (9)$$

It is seen from equation (9) that the first frequency $F_X$ of the first signal output by diplexer 340 is a function of the rotational force fc applied to MEMS teeter-totter capacitive transducer 100. So it is apparent that the rotational force $f_C$ can be ascertained from the first frequency $F_X$ which is the difference between the second oscillator frequency and the first oscillator frequency.

The second diplexer output of diplexer 340 provides a second signal that has a second frequency $F_Y$ that is the sum of the second oscillator frequency of second oscillator 320, $F_2(f_A, f_C)$ and the first oscillator frequency of first oscillator 310, $F_1(f_A, f_C)$. From equations (4), (7) and (8) above we get:

$$F_Y \approx 2F0 + 0.5*F0*((\Delta C_{1,2}(f_A)/C_Y) + (\Delta C_{1,2}(f_A)/C_Y))$$

$$F_Y \approx 2F0 + F0*(\Delta C_{1,2}(f_A)/C_Y \quad (10)$$

It is seen from equation (10) that the second frequency $F_Y$ of the second signal output by diplexer 340 is a function of the acceleration force $f_A$ applied to MEMS teeter-totter capacitive transducer 100. So it is apparent that the acceleration force $f_A$ can be ascertained from the second frequency $F_Y$.

Although the second frequency $F_Y$ of the second signal output by diplexer 340 is a function of the acceleration force $f_A$, second frequency $F_Y$ also contains a component at twice the nominal frequency of first and second oscillators 310 and 320 (i.e. at 2*F0). This may make it difficult to extract the desired acceleration information directly from the second signal.

Accordingly, device 300 includes third oscillator 350, second mixer 360, and filter (e.g., a low pass filter (LPF)) 370. In a beneficial arrangement, third oscillator 350 operates at a third oscillator frequency F3=2*F0+ϵ, where F0>>ϵ. Second mixer 360 receives the second signal from diplexer 340 and the third oscillator signal from third oscillator 350 and generates a third signal having a third frequency, $F_Z$, where:

$$F_Z = \epsilon + F0*(\Delta C_{1,2}(f_A)/C_Y) \quad (11)$$

Filter 370 filters out a high frequency component from mixer second 360 at 4*F0.

It is seen from equation (11) that the third frequency $F_Z$ of the third signal output by second mixer 360 (via filter 370) is a function of the acceleration force $f_A$ applied to MEMS teeter-totter capacitive transducer 100. So it is apparent that the acceleration force $f_A$ can be ascertained from the third frequency $F_Z$.

If desired, the first signal with the frequency $F_X$ and the third signal with the frequency $F_Z$ may be applied to frequency detectors 380 and 390 to quantify the rotational force and the (linear) acceleration force applied to device 300.

As illustrated in FIG. 3, device 300 may be divided into three components: 301, 302 and 303. In some embodiments, component 301 may comprise a first "MEMS" die such as was described above with respect to FIGS. 1A-D, component 302 may comprise a first packaged "FMOS" device as will be described below with respect to FIGS. 4-7, and component 303 may comprise a separate electronic component, which may be another packaged FMOS device. In such embodiments, components 301 and 302 may be packaged tightly together to minimize stray or parasitic capacitance for the oscillators. In particular, packaged FMOS device comprising component 302 may be "flip-chipped" onto the MEMS die comprising component 301. In other embodiments, components 302 and some or all of the elements in component 303 may be combined into one packaged FMOS device. In other embodiments, the division of elements into the components 301, 302 and 303 may be different than that shown in FIG. 3. For example, in some embodiments, third oscillator 350, second mixer 360, and filter 370 may be included in component 302 (e.g., in a same packaged FMOS device as first and second oscillators 310 and 320 and first mixer 330).

For a three dimensional gyroscope to measure rotation in three dimensions, three components 301 (i.e., three MEMS teeter-totter capacitive transducers 100) and three components 302 (i.e., three packaged FMOS devices), together with three second mixers 360 and associated filters 370, and one third oscillator 350 are needed.

In a beneficial arrangement, component 302 may be provided as a packaged FMOS device using methods and devices disclosed in U.S. Pat. No. 8,232,845 in the names of Richard Ruby, et al., the entirety of which is hereby incorporated herein by references as if fully set forth herein, and aspects of which are discussed below with respect to FIGS. 4-7

Figure 4:
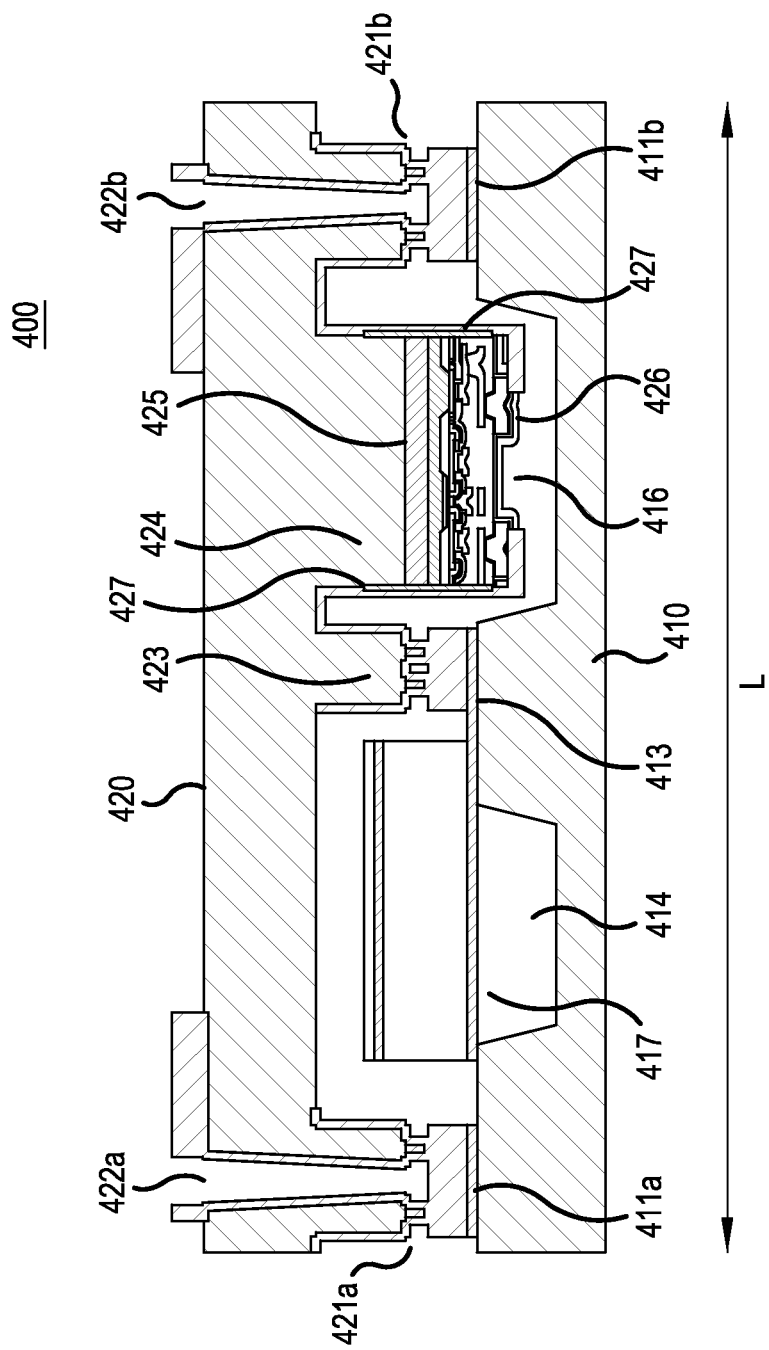
FIG. 4 shows a cross-sectional view of a portion of one example embodiment of a packaged FMOS device.

FIG. 4 shows a cross-sectional view of a portion of one example embodiment of a packaged FMOS device 400. Packaged FMOS device 400 comprises a base substrate 410 and a lid substrate 420.

Figure 5:
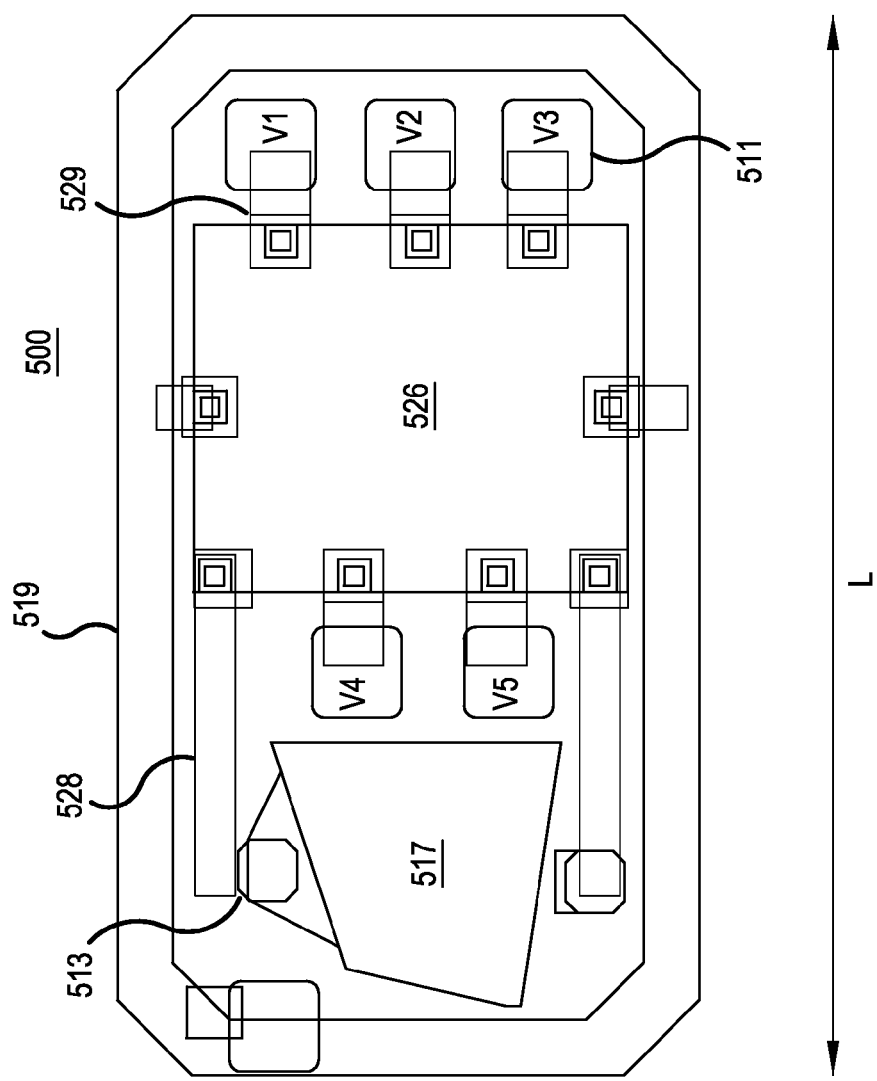
FIG. 5 shows a top cutaway view of another example embodiment of a packaged FMOS device.
Figure 6A:
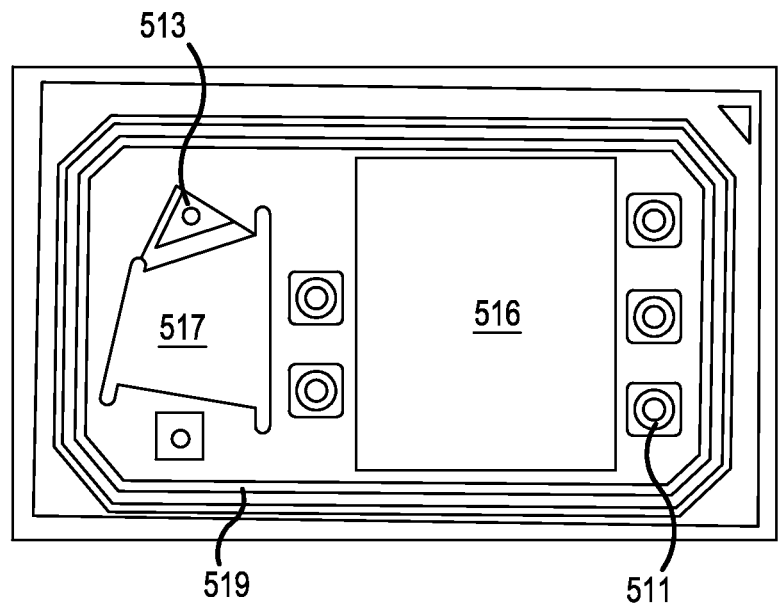
FIGS. 6A-B show two substrates employed in the packaged FMOS device of FIG. 5.

Base substrate 410 has on a first surface (top surface as shown in FIG. 4) thereof: first bonding pads 411a and 411b; a second bonding pad 413; a first recessed region 414; and a second recessed region 416. Base substrate 410 further includes on the first surface thereof a peripheral pad not shown in FIG. 4, but examples of which are illustrated in FIGS. 5 and 6A. Beneficially, first bonding pads 411a and 411b, second bonding pad 413, and the peripheral pad are formed of an electrically conductive (e.g., metal) material. Also, in some embodiments base substrate 410 may include additional first and second bonding pads 411 and 413.

Lid substrate 420 has on a first surface (bottom surface as shown in FIG. 4) thereof: bonding pad seals 421a and 421b, each having a corresponding through hole 422a and 422b formed in lid substrate 420; a drop down contact post 423: a pedestal 424; a low-resistivity material layer region 425; and electronic circuitry 426 formed on low-resistivity material layer region 425. Lid substrate 420 further includes on the first surface thereof a peripheral pad seal not shown in FIG. 4, but examples of which are illustrated in FIGS. 2 and 3B. Beneficially, bonding pad seals 421a and 421b and drop down contact post 423 each have an electrically conductive (e.g., a metal such as gold) layer thereon for making contact with the corresponding bonding pads 411 and 413. Also, in some embodiments lid substrate 420 may include additional bonding pad seals 421 and/or additional drop down contact posts 423. In some embodiments, one or more of through holes 422 in lid substrate 420 are plated or otherwise filled with a conductive material (e.g. metal) to provide an electrical connection between the metal layer of a corresponding bonding pad seal 421 and a second surface (top surface as shown in FIG. 4) of lid substrate 420, for example a pad on the second surface of lid substrate 420. As shown in FIG. 4, in some embodiments, bonding pad seals 421 and/or drop down contact posts 423 include treads or gaskets that are covered with the electrically conductive material.

Packaged FMOS device 400 further comprises an acoustic resonator 417 disposed on base substrate 410 above first recessed region 414. In some embodiments, acoustic resonator 417 is electrically connected to electronic circuitry 426, for example by means of second bonding pad 413 and the conductive (e.g., metal) layer on drop down contact post 423. In some embodiments, acoustic resonator 417 comprises a film bulk acoustic resonator (FBAR). In other embodiments, a solidly mounted resonator (SMR) may be employed. In some embodiments, electronic circuitry 426 includes one or more transistors or other active devices of an oscillator circuit that operates with acoustic resonator 417 to form an oscillator In some embodiments, base substrate 410 and/or lid substrate 420 comprise a semiconductor substrate. In some embodiments, lid substrate 420 can be made of an electronically non-conductive material or a high-resistivity semiconductor material, such as single crystal silicon. Also, in some embodiments when lid substrate 420) is a semiconductor substrate, low-resistivity material layer region 425 comprises an epitaxial layer formed on the semiconductor substrate. In alternative embodiments, lid substrate 420 may comprise other high-resistivity materials, for example a silicon-on-insulator (SOT) substrate, and low-resistivity material layer region 425 may be formed by controlled doping of the SOT substrate.

In some embodiments, base substrate 410 and lid substrate 420 are made of materials that have the same or approximately the same coefficient of thermal expansion (CTE) as each other to avoid thermal expansion mismatch problems. In some embodiments base substrate 410 and lid substrate 420 are made of the same semiconductor material as each other.

As noted above, in some embodiments lid substrate 420 is a semiconductor substrate. In general, such a semiconductor substrate on which electronic circuitry 426 is to be fabricated will have a low-resistivity material layer disposed on all or substantially all of a surface thereof for the formation of the semiconductor or active devices of electronic circuitry 426. In particular, such a low-resistivity material layer comprises a material that has a substantially lower resistivity than the high-resistivity semiconductor material of lid substrate 420. As used herein. "substantially lower resistivity" means about one order of magnitude lower resistivity, or more than one order of magnitude lower resistivity, for example as measured in terms of Ω-cm. For example, in some embodiments, the high-resistivity semiconductor material of lid substrate 420 has a resistivity of more than 1000 Ω-cm, while the low-resistivity material of a low-resistivity material layer has a resistivity of less than 100 Ω-cm, including in some embodiments a resistivity in a range of 10 Ω-cm. Accordingly, if left intact on lid substrate 420, such a low-resistivity material layer may provide a low impedance path or electrical short between the conductive (e.g., metal) layer(s) of bonding pad seals 421 and/or drop down contact post(s) 423. This can degrade the performance of packaged FMOS device 400, and in some cases may render packaged FMOS device 400 inoperable.

Accordingly, in some embodiments one or more portions of the low-resistivity material layer is removed between bonding pad seals 421, drop down contact posts 423, and the peripheral pad seal so as to eliminate a current path through the low-resistivity material layer between any of the bonding pad seals 421, drop down contact posts 423, and the peripheral pad seal. Furthermore, in some embodiments one or more portions of the low-resistivity material layer are removed so as to eliminate a current path between low-resistivity material layer region 425 and the conductive layer(s) of some or all of the bonding pad seals 421, and/or drop down contact posts 423, and/or the peripheral pad seal.

In a particular embodiment of packaged FMOS device 400 shown in FIG. 4, the low-resistivity material layer (e.g., epitaxial layer) is eliminated except for: (1) low-resistivity material layer (e.g., epitaxial layer) region 425, which is isolated from some or all of the bonding pad seals 421, and/or drop down contact posts 423, and/or the peripheral pad seal; and (2) one or more low-resistivity material layer (e.g., epitaxial layer) portions remaining in the treads of one or more of the bonding pad seal(s) 421, drop down contact post(s) 423, and the peripheral pad seal. Furthermore, lid substrate 420 of packaged FMOS device 400 includes an electrically insulating material 427 (e.g., an oxide such as silicon oxide) electrically isolating low-resistivity material layer (e.g., epitaxial layer) region 425 from one or more electrically conductive (e.g., metal) layers or traces in contact with bonding pad seal(s) 421 and drop down contact post(s) 423. In some embodiments, electrically insulating material 427 partially or totally encompasses or surrounds low-resistivity material layer (e.g., epitaxial layer) region 425.

In some embodiments, lid substrate 420 may have a low-resistivity material layer (e.g., epitaxial layer) formed entirely on the first surface thereof, and the low-resistivity material layer (e.g. epitaxial layer)—except for low-resistivity material layer (e.g., epitaxial layer) region 425 and the low-resistivity material layer (e.g., epitaxial layer) portions remaining in the treads—may be removed after formation of electronic circuitry 426. In other embodiments, the low-resistivity material layer (e.g., epitaxial layer)—except for low-resistivity material layer (e.g. epitaxial layer) region 425 and the low-resistivity material layer (e.g., epitaxial layer) portions remaining in the treads—may be removed before formation of electronic circuitry 426.

In other embodiments, the low-resistivity material layer (e.g., epitaxial layer) is only removed in areas surrounding each of the bonding pad seals 421, and/or drop down contact posts 423, and/or the peripheral pad seal so as to electrically isolate the bonding pad seals 421, and/or drop down contact posts 423, and/or the peripheral pad seal from each other and/or from electronic circuitry 426.

FIG. 5 shows a top cutaway view of another example embodiment of a packaged FMOS device 500. Packaged FMOS device 500 comprises a base substrate 510 and a lid substrate 520, which are better seen in FIGS. 6A and 6B. FIG. 5 illustrates an electrically conductive trace or connection 528 between electronic circuitry 526 and an acoustic resonator 517 of packaged FMOS device 500 via second bonding pad 513 and drop down contact post 523 (see FIG. 6B), and an electrically conductive trace or connection 529 between electronic circuitry 526 of packaged FMOS device 500 and first bonding pad 511 via bonding pad seal 511. FIG. 5 also shows that acoustic resonator 517 is laterally offset with respect to electronic circuitry 526 in packaged FMOS device 500.

Figure 6B:
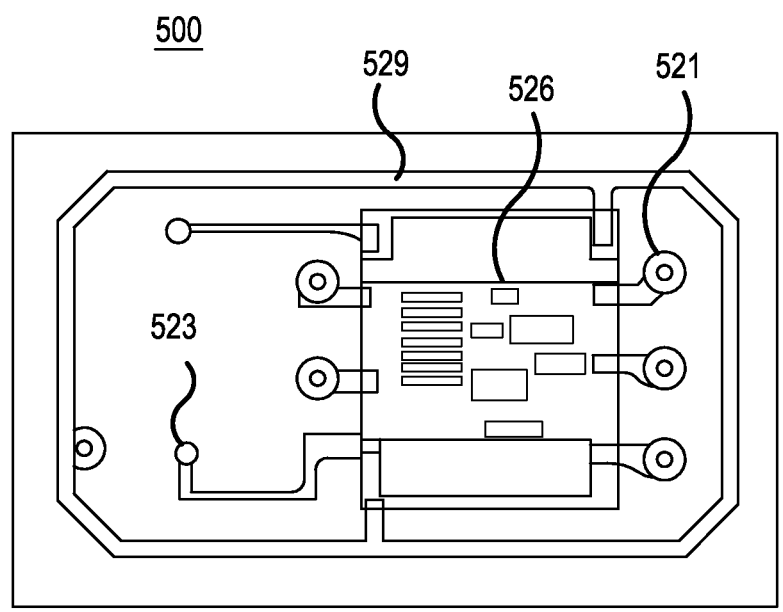

In particular, FIG. 6A shows base substrate 510, and FIG. 6B shows lid substrate 520. FIG. 6A illustrates first bonding pad 511, second bonding pad 513, peripheral pad 519, a second recessed region 516 that is disposed beneath electronic circuitry 526 when base substrate 510 is bonded to lid substrate 520 to form packaged FMOS device 500. FIG. 6B shows peripheral pad seal 529, bonding pad seal 521, and drop down contact post 523.

Packaged FMOS 500 may include features described above with respect to packaged FMOS device 400, including electrical isolation of an epitaxial layer region on lid substrate 520 from bonding pad seal 521, drop down contact post 523 and peripheral pad seal 529.

In some embodiments, base substrates 410/510, and lid substrates 420/520, are configured to be parametrically tested individually prior to assembly.

An example process of assembling packaged FMOS devices 400 and 500 will now be described.

In the example embodiment, bonding pad treads or gaskets of bonding pad seal(s) match the perimeters of the first bonding pad(s) on the base substrate, drop down contact post treads or gaskets of drop down contact post(s) match the perimeters of the second bonding pad(s) on the base substrate, and peripheral pad treads or gaskets of the peripheral pad seal match the peripheral pad on the base substrate. Wells are located inside the perimeters of the bond pad gaskets and are formed to a predetermined depth in the lid substrate. The lid substrate is then placed over the base substrate so as to bond (e.g., a cold weld bond) the peripheral pad seal to the peripheral pad, and to likewise bond the bonding pad seal(s) and the drop down contact post(s) to corresponding bonding pad(s) and form a hermetically sealed volume between the bonding pad seals and the peripheral pad seal. The lid substrate is thinned to form a "microcap." Essentially, the microcap is thinned below a predetermined depth until the wells become through holes that provide access for making an electrical connection to the bonding pads inside the package, but outside the hermetically sealed volume, for external conductors, which may include conductive wires provided inside the though holes and/or a conductive (e.g. metal) layer plated or deposited in the through holes. This arrangement assures a highly reliable hermetic seal for devices (e.g., electronic circuitry and acoustic resonator) inside the package, while allowing electrical connections without passing through a seal. Further, this process permits the substrates to be made thin because it forms the microcap in situ and avoids the handling of the fragile microcap during assembly.

A description of additional details regarding embodiments of methods of assembling a lid substrate to a base substrate is provided in U.S. Pat. No. 6,425,911, which description is hereby incorporated herein by reference as if set forth herein.

When the base substrate and lid substrate are bonded together as described above a hermetically-sealed volume is formed between the lid substrate and the base substrate. In that case, the acoustic resonator, the low-resistivity material layer (e.g., epitaxial layer) region, the electronic circuitry, the second bonding pad(s), and the drop down contact post(s) are disposed within the hermetically-sealed volume.

In some embodiments, base substrates 410/510, and lid substrates 420/520, are individually parametrically tested prior to bonding the semiconductor substrates together.

The packaging arrangement illustrated above with respect to packaged FMOS devices 400 and 500) may be employed for a variety of electronic devices.

In some embodiments, packaged FMOS devices 400 and/or 500 may comprise an oscillator, mixer and other possible electronic circuits. In that case, electronic circuitry 426/526 may comprise oscillator circuitry that includes one or more transistors or other active devices of the oscillator. Beneficially, the packaging arrangement of packaged FMOS devices 400 and 500 may provide certain benefits for such an oscillator, including a small size, and tight coupling between the resonator and the active circuitry of the oscillator which can reduce noise and losses and therefore improve performance of the oscillator.

Figure 7:
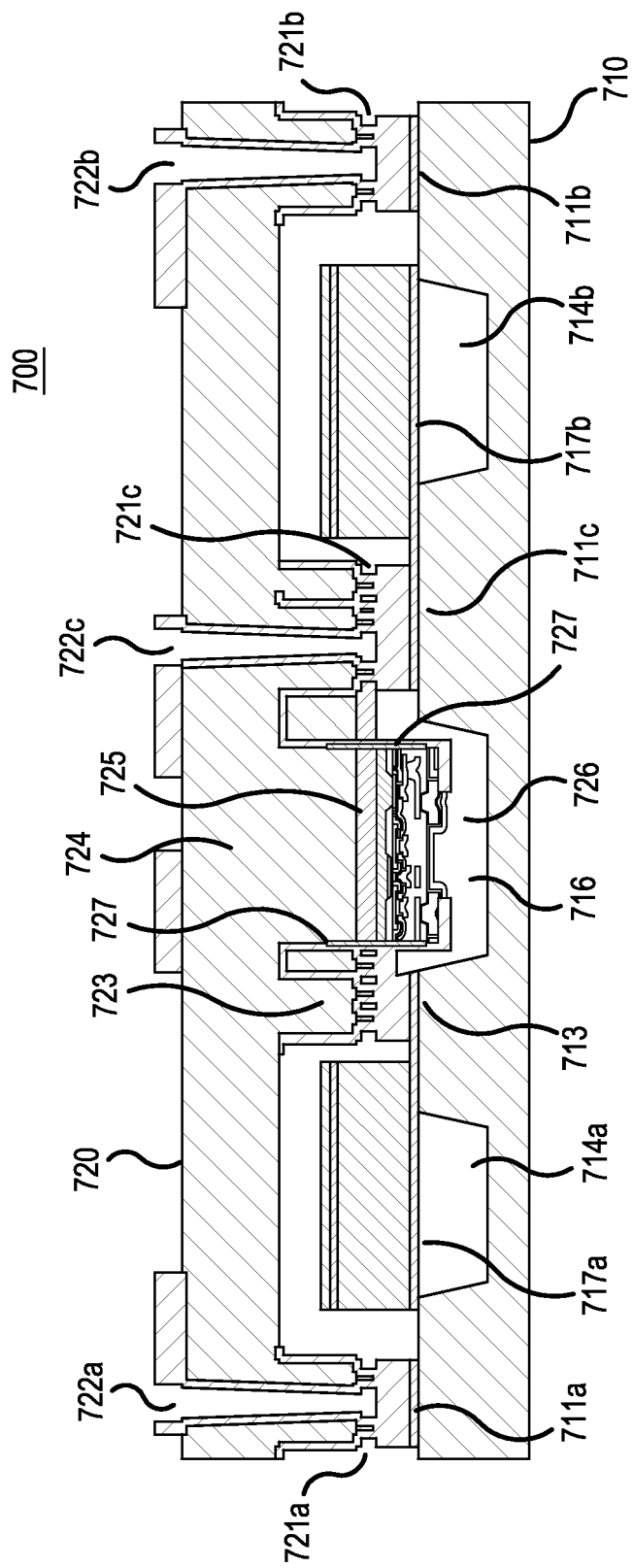
FIG. 7 shows an example embodiment of a packaged FMOS device with two FBAR resonators that may be employed in a combined accelerometer and rotation detector.

FIG. 7 shows an example embodiment of a packaged FMOS device 700 with two FBAR oscillators that may be employed in a combined accelerometer and rotation detector.

Packaged FMOS device 700 comprises a base substrate 710 and a lid substrate 720.

Base substrate 710 has on a first surface (top surface as shown in FIG. 7) thereof: first bonding pads 711a, 711b and 711c; a second bonding pad 713; first recessed regions 714a and 714b; and a second recessed region 716. Base substrate 710 further includes on the first surface thereof a peripheral pad not shown in FIG. 7, but examples of which are illustrated in FIGS. 5 and 6A above. Beneficially, first bonding pads 711 and second bonding pad(s) 713, and the peripheral pad are formed of an electrically conductive (e.g., metal) material. Also, in some embodiments base substrate 710 may include additional first and second bonding pads 711 and 713.

Lid substrate 720 has on a first surface (bottom surface as shown in FIG. 7) thereof: bonding pad seals 721a, 721b and 721c, each having a corresponding through hole 722a, 722b and 722c formed in lid substrate 720; a drop down contact post 723; a pedestal 724; a low-resistivity material layer region 725; and electronic circuitry 726 formed on low-resistivity material layer region 725. Lid substrate 720 further includes on the first surface thereof a peripheral pad seal not shown in FIG. 7, but examples of which are illustrated in FIGS. 5 and 6B. Beneficially, bonding pad seals 721a, 721b and 721c and drop down contact post 723 each have an electrically conductive (e.g., a metal such as gold) layer thereon for making contact with the corresponding bonding pads 711 and 713. Also, in some embodiments lid substrate 720 may include additional bonding pad seals 721 and/or additional drop down contact posts 723. In some embodiments, one or more of through holes 722 in lid substrate 720 are plated or otherwise filled with a conductive material (e.g., metal) to provide an electrical connection between the metal layer of a corresponding bonding pad seal 721 and a second surface (top surface as shown in FIG. 7) of lid substrate 720, for example a pad on the second surface of lid substrate 720. As shown in FIG. 7, in some embodiments, bonding pad seals 721 and/or drop down contact posts 723 include treads or gaskets that are covered with the electrically conductive material.

Packaged FMOS device 700 further comprises acoustic resonators 717a and 717b disposed on base substrate 710 above corresponding first recessed regions 714a and 714b. In some embodiments, acoustic resonators 717a and 717b are each electrically connected to electronic circuitry 726, for example by means of first and/or second bonding pads 711, 713 and the conductive (e.g., metal) layer on bonding pad seal(s) 721 and/or drop down contact post 723. In some embodiments, each of the acoustic resonators 717a and 717b comprises a film bulk acoustic resonator (FBAR). In other embodiments, a solidly mounted resonator (SMR) may be employed. In some embodiments, electronic circuitry 726 includes one or more transistors or other active devices for two oscillators (e.g., oscillators 310 and 320 of FIG. 3) that operate respectively with acoustic resonators 717a and 717b. In some embodiments, electronic circuitry 726 may include one or more other elements shown in FIG. 3, including for example first mixer 330, diplexer 340, second mixer 360 and/or filter 370.

In some embodiments, base substrate 710 and/or lid substrate 720 comprise a semiconductor substrate. In some embodiments, lid substrate 720 can be made of an electronically non-conductive material or a high-resistivity semiconductor material, such as single crystal silicon. Also, in some embodiments when lid substrate 720 is a semiconductor substrate, low-resistivity material layer region 725 comprises an epitaxial layer formed on the semiconductor substrate. In alternative embodiments, lid substrate 720 may comprise other high-resistivity materials, for example a silicon-on-insulator (SOI) substrate, and low-resistivity material layer region 725 may be formed by controlled doping of the SOI substrate.

In some embodiments, base substrate 710 and lid substrate 720 are made of materials that have the same or approximately the same coefficient of thermal expansion (CTE) as each other to avoid thermal expansion mismatch problems. In some embodiments base substrate 710 and lid substrate 720 are made of the same semiconductor material as each other.

As noted above, in some embodiments lid substrate 720 is a semiconductor substrate. In general, such a semiconductor substrate on which electronic circuitry 726 is to be fabricated will have a low-resistivity material layer disposed on all or substantially all of a surface thereof for the formation of the semiconductor or active devices of electronic circuitry 726. In particular, such a low-resistivity material layer comprises a material that has a substantially lower resistivity than the high-resistivity semiconductor material of lid substrate 720. As used herein, "substantially lower resistivity" means about one order of magnitude lower resistivity, or more than one order of magnitude lower resistivity, for example as measured in terms of $\Omega$-cm. For example, in some embodiments, the high-resistivity semiconductor material of lid substrate 720 has a resistivity of more than 1000 $\Omega$-cm, while the low-resistivity material of a low-resistivity material layer has a resistivity of less than 100 $\Omega$-cm, including in some embodiments a resistivity in a range of 10 $\Omega$-cm. Accordingly, if left intact on lid substrate 720, such a low-resistivity material layer may provide a low impedance path or electrical short between the conductive (e.g., metal) layer(s) of bonding pad seals 721 and/or drop down contact post(s) 723. This can degrade the performance of packaged FMOS device 700, and in some cases may render packaged FMOS device 700 inoperable.

Accordingly, in some embodiments one or more portions of the low-resistivity material layer is removed between bonding pad seals 721, drop down contact posts 723, and the peripheral pad seal so as to eliminate a current path through the low-resistivity material layer between any of the bonding pad seals 721, drop down contact posts 723, and the peripheral pad seal. Furthermore, in some embodiments one or more portions of the low-resistivity material layer are removed so as to eliminate a current path between low-resistivity material layer region 725 and the conductive layer(s) of some or all of the bonding pad seals 721, and/or drop down contact posts 723, and/or the peripheral pad seal.

In a particular embodiment of packaged FMOS device 700 shown in FIG. 7, the low-resistivity material layer (e.g., epitaxial layer) is eliminated except for: (1) low-resistivity material layer (e.g., epitaxial layer) region 725, which is isolated from some or all of the bonding pad seals 721, and/or drop down contact posts 723, and/or the peripheral pad seal; and (2) one or more low-resistivity material layer (e.g., epitaxial layer) portions remaining in the treads of one or more of the bonding pad seal(s) 721, drop down contact post(s) 723, and the peripheral pad seal. Furthermore, lid substrate 720 of packaged FMOS device 700 includes an electrically insulating material 727 (e.g., an oxide such as silicon oxide) electrically isolating low-resistivity material layer (e.g., epitaxial layer) region 725 from one or more electrically conductive (e.g., metal) layers or traces in contact with bonding pad seal(s) 721 and drop down contact post(s) 723. In some embodiments, electrically insulating material 727 partially or totally encompasses or surrounds low-resistivity material layer (e.g., epitaxial layer) region 725.

In some embodiments, lid substrate 720 may have a low-resistivity material layer (e.g., epitaxial layer) formed entirely on the first surface thereof, and the low-resistivity material layer (e.g., epitaxial layer)—except for low-resistivity material layer (e.g., epitaxial layer) region 725 and the low-resistivity material layer (e.g., epitaxial layer) portions remaining in the treads—may be removed after formation of electronic circuitry 726. In other embodiments, the low-resistivity material layer (e.g., epitaxial layer)—except for low-resistivity material layer (e.g., epitaxial layer) region 725 and the low-resistivity material layer (e.g., epitaxial layer) portions remaining in the treads—may be removed before formation of electronic circuitry 726.

In other embodiments, the low-resistivity material layer (e.g., epitaxial layer) is only removed in areas surrounding each of the bonding pad seals 721, and/or drop down contact posts 723, and/or the peripheral pad seal so as to electrically isolate the bonding pad seals 721, and/or drop down contact posts 723, and/or the peripheral pad seal from each other and/or from electronic circuitry 726.

While example embodiments are disclosed herein, one of ordinary skill in the art appreciates that many variations that are in accordance with the present teachings are possible. The invention therefore is not to be restricted except within the scope of the claims.

The invention claimed is:

1. A device, comprising:
   a base substrate having a first bonding pad and a peripheral pad provided thereon, the peripheral pad encompassing the first bonding pad;
   a first acoustic resonator and a second acoustic resonator disposed on the base substrate;
   a lid substrate having a bonding pad seal and a peripheral pad seal provided thereon, the bonding pad seal bonding around the perimeter of the first bonding pad and the peripheral pad seal bonding with the peripheral pad to define a hermetically sealed volume between the lid substrate and the base substrate, the lid substrate defining a through hole therein positioned over the first bonding pad, the through hole providing access for an electrical connection to the first bonding pad; and
   electronic circuitry provided on a portion of a first surface of the lid substrate within the hermetically sealed volume, the electronic circuitry comprising:
      first oscillator circuitry electrically connected with the first acoustic resonator to form a first oscillator, the first oscillator further being electrically connected to a first capacitor of a teeter-totter capacitive transducer such that a first oscillator frequency of the first oscillator changes in response to a change in the capacitance of the first capacitor; and
      second oscillator circuitry electrically connected with the second acoustic resonator to form a second oscillator, the second oscillator further being electrically connected to a second capacitor of the teeter-totter capacitive transducer such that a second oscillator frequency of the second oscillator changes in response to a change in the capacitance of the second capacitor.

2. The device of claim 1, wherein the electronic circuitry further comprises:
   a mixer having first and second mixer inputs connected respectively to an output of the first oscillator and to an output of the second oscillator; and
   a diplexer having an input connected to an output of the mixer and having first and second diplexer outputs, wherein the first diplexer output is configured to provide a first signal having a first frequency that is a function of one of: (1) an acceleration force applied to the teeter-totter capacitive transducer, and (2) a rotational force applied to the teeter-totter capacitive transducer.

3. The device of claim 2, wherein the first diplexer output is configured to provide the first signal having the first frequency that is a function of the rotational force, and the second diplexer output is configured to provide a second signal having a second frequency that is a function of the acceleration force.

4. The device of claim 3, further comprising:
   a third oscillator;
   a second mixer, having a first input connected to an output of the third oscillator, a second input connected to the second diplexer output, and an output; and
   a low pass filter having an input connected to the output of the second mixer and being configured to output a third signal having a third frequency that is a function of the rotational force.

5. The device of claim 4, wherein the third oscillator includes a third acoustic resonator.

6. The device of claim 4, wherein in the absence of the acceleration force and the rotational force, the first oscillator frequency of the first oscillator and the second oscillator frequency of the second oscillator are substantially the same as each other, and wherein a third oscillator frequency of the third oscillator is substantially twice the first frequency.

7. The device of claim 1, wherein in response to the acceleration force, the first oscillator frequency of the first oscillator is increased and the second oscillator frequency of the second oscillator is also increased.

8. The device of claim 1, wherein in response to the rotational force, the first oscillator frequency of the first oscillator is decreased and the second oscillator frequency of the second oscillator is increased.

9. The device of claim 1, further comprising a die including the teeter-totter capacitive transducer.

10. The device of claim 1, wherein the first acoustic resonator, or the second acoustic resonator, or both, are a film bulk acoustic resonator (FBAR).

11. The device of claim 1, wherein the first acoustic resonator, or the second acoustic resonator, or both, are a solidly mounted resonator (SMR).

12. The device of claim 1, wherein the first acoustic resonator, or the second acoustic resonator, or both, are a zero drift resonator (ZDR).

13. The device of claim 1, wherein the lid substrate comprises a comparatively low-resistivity material layer region.

14. The device of claim 13, wherein the electronic circuitry is disposed over the comparatively low-resistivity material layer region.

15. The device of claim 13, wherein the comparatively low-resistivity material layer region comprise.

16. The device of claim 1, wherein an electrically conductive layer is disposed over the bonding pad seal.

17. The device of claim 1, further comprising a drop down contact post.

18. The device of claim 17, wherein an electrically conductive layer is disposed over the drop down post.

* * * * *